United States Patent
Schneller et al.

(10) Patent No.: US 6,214,891 B1
(45) Date of Patent: *Apr. 10, 2001

(54) PROCESS FOR PRODUCING A CATION-EXCHANGING POLYMER ELECTROLYTE MEMBRANE (PEM)

(75) Inventors: Arnold Schneller, Messel; Helmut Witteler, Beindersheim, both of (DE)

(73) Assignee: Hoechst Research & Technology Deutschland GmbH & Co., KG, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,756

(22) PCT Filed: Apr. 24, 1997

(86) PCT No.: PCT/EP97/02103

§ 371 Date: Dec. 22, 1998

§ 102(e) Date: Dec. 22, 1998

(87) PCT Pub. No.: WO97/40543

PCT Pub. Date: Oct. 30, 1997

(30) Foreign Application Priority Data

Apr. 24, 1996 (DE) ............................................. 196 16 160

(51) Int. Cl.$^7$ ........................................................ C08J 5/20
(52) U.S. Cl. .................................................................. 521/27
(58) Field of Search ................................................ 521/27

(56) References Cited

U.S. PATENT DOCUMENTS

| | | |
|---|---|---|
| 4,876,115 | 10/1989 | Raistrick . |
| 5,211,984 | 5/1993 | Wilson . |
| 5,272,017 | 12/1993 | Swathirajan et al. . |

FOREIGN PATENT DOCUMENTS

| | | |
|---|---|---|
| 0574791 A2 | 12/1993 | (EP) . |
| 0604882 A2 | 7/1994 | (EP) . |
| 0637851 A1 | 2/1995 | (EP) . |
| WO 94/14203 | 6/1994 | (WO) . |
| WO 96/13073 | 5/1996 | (WO) . |

OTHER PUBLICATIONS

Holze et al., Journal of Membrane Science, vol. 73, Oct. 2, 1992, No. 1.

*Primary Examiner*—Helen L. Pezzuto
(74) *Attorney, Agent, or Firm*—Frommer Lawrence & Haug LLP

(57) ABSTRACT

A method for preparing a cation exchange membrane, comprising the introduction of an organic polymer having sulfonic acid groups and of finely disperse electrically conductive particles of a catalyst material into a liquid phase, the resulting suspension being used to coat a foil of a cation exchange material on at least one side, wherein the organic polymer having sulfonic acid groups is soluble in an aprotic polar solvent and contains units of the formulae $(Ar^1X)$ and $(Ar^2Y)$ which are at least partially substituted by sulfonic acid groups, $Ar^1$ and $Ar^2$ being identical or different bivalent arylene radicals, X being oxygen or sulfur and Y being a carbonyl radical, sulfoxide radical or sulfonyl radical and said material being dissolved in a solvent, a finely disperse electrically conductive catalyst material being suspended in the solution and this suspension being used to coat a foil which contains a polymeric cation exchanger having sulfonic acid groups and the coating which still contains solvent being treated with a liquid which is miscible with the solvent, but in which the dissolved cation exchange material is insoluble, so that pores are formed in the top layer of the membrane.

8 Claims, No Drawings

PROCESS FOR PRODUCING A CATION-EXCHANGING POLYMER ELECTROLYTE MEMBRANE (PEM)

The invention relates to a method for preparing a cation exchange membrane, in particular for electrochemical cells.

Cation exchange membranes having a catalytically active surface layer can be used as proton conductor membranes in fuel cells. For this purpose, the catalyst for the electrochemical reactions to be carried out in the fuel cell is used in finely disperse form on conductive activated carbon. The activated carbon serves to establish electrical contact with the catalyst particles.

Conventional methods for preparing cation exchange membranes which are coated with platinum and platinum metals and which can be used as solid proton conductors in low-temperature fuel cells are the so-called "ink" methods. These involve an electrically conductive carbon material (e.g. platinum/activated carbon having a platinum percentage by weight of from 20 to 40%) coated with a suitable catalyst being suspended in the solution of a sulfonated fluoropolymer and the suspension thus obtained being applied to a suitable membrane (U.S. Pat. Nos. 5,211,984, 5,272,017).

In various variations on the "ink" method, the suspension used for coating is further admixed with a hydrophobic material; for example polytetrafluoroethylene (PTFE) or fluorinated graphite (EP-A-0 483 085, EP-A-0 560 295, U.S. Pat. No. 5,272,017). The hydrophobization thus effected of the catalytically active layer manifests itself in membrane fuel cells, especially on the cathode side (also referred to as "oxygen side"), by increased effectivity of the catalytically active layer.

It is also known to use ruthenium, ruthenium oxide, iridium oxide, molybdenum carbide and tungsten carbide to optimize the efficiency of the catalytically active layer (U.S. Pat. No. 4,876,115, EP-A-0 560 295, K. Ledjeff et al., Int. J. Hydrogen Energy 19, 453–455 (1994)).

One method for preparing porous, catalytically active top layers is based on the use of mixtures of activated carbon, PTFE, platinum/carbon and activated carbon impregnated with a cation exchanger. These mixtures are applied to proton conductor membranes (EP-A-0 577 291). Usually, the material used for the catalytically active coating of the cation exchange membranes comprises polymers having perfluorinated carbon backbones which are laterally linked to ionic groups, usually sulfonic acid groups (for example ®Nafion TM). This also applies to the solutions of cation exchange polymers which are applied to membranes in accordance with said methods. While these polymers are chemically highly stable this stability (e.g. with respect to chlorine and alkalis), which is not even needed to its full extent in membrane fuel cells, does not by any means make up for their high price and the difficulties in processing them which are due to their poor solubility in conventional solvents.

Only one of the abovementioned methods (EP-A-0 577 291) employs an option of enlarging the specific surface area of the catalytically active top layer of the membrane and thus to increase the contact area between the fuel gases of a fuel cell and the catalyst. The process carried out to this end is at the expense, however, of the continuity of the proton conductor phase in the catalytically active top layer.

It is therefore an object of the present invention to provide a technically and economically favorable alternative to current coating methods of ion exchange membranes for electrochemical cells. It is a further object of the invention to provide a cation exchange membrane, in particular for a membrane/electrode unit, which allows the fuel gases of a membrane fuel cell free access to as large a catalytically active membrane surface area as possible.

This object is achieved according to the invention by a method for preparing a cation exchange membrane, comprising the introduction of an organic polymer having sulfonic acid groups and of finely disperse electrically conductive particles of a catalyst material into a liquid phase, the resulting suspension being used to coat a foil of a cation exchange material on at least one side. The organic polymer having sulfonic acid groups is soluble in an aprotic polar solvent and contains units of the formulae $(Ar^1X)$ and $(Ar^2Y)$ which are at least partially substituted by sulfonic acid groups, $Ar^1$ and $Ar^2$ being identical or different bivalent arylene radicals, X being oxygen or sulfur and Y being a carbonyl radical, sulfoxide radical or sulfonyl radical. The organic polymer is dissolved in a solvent, a finely disperse electrically conductive catalyst material is suspended in the solution and this suspension is used to coat a foil which contains a polymeric cation exchanger having sulfonic acid groups. The coating which still contains solvent is treated with a liquid which is miscible with the solvent, but in which the dissolved cation exchange material is insoluble, so that pores are formed in the top layer of the membrane.

The polymer may also contain a plurality of different units of the formula $(Ar^1X)$ and a plurality of different units of the formula $(Ar^2Y)$. The polymer may further contain bivalent radicals of the formula $Ar^3$—$C(CH_3)_2$—, $Ar^3$—$C(CF_3)_2$—, $Ar^3$—$C$-$(phenyl)_2$—, the radical $Ar^3$-cyclohexylene or the radical —Ar-fluorene, $Ar^3$ being an aromatic unit.

The arylene radicals $Ar^1$ and $Ar^2$ are bivalent aromatic units, for example the phenylene, biphenylene, naphthylene or anthrylene radical. Preferably, $Ar^1$ and $Ar^2$ are the phenylene radical, in particular the 1,4-phenylene radical. Preferred aromatic units are aromatic polyetherketones, polyethersulfones, poly(arylene sulfides), for example of the formulae I to V, or polybenzimidazoles

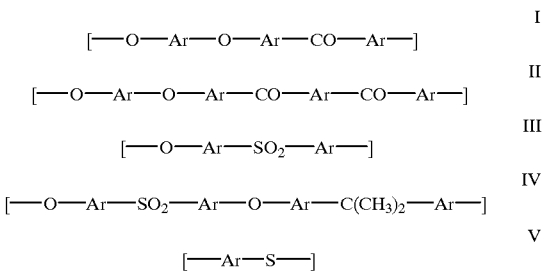

The polymer of the cation exchange material may further contain bivalent N,N'-pyromellitic diimide units, phthalimide units and/or benzimidazole units.

Sulfonation affords polymers which carry a sulfonic acid group —$SO_3H$ on all or some of the aromatic units. Used in particular are sulfonation products of polyaryletherketones (I, II), polyarylethersulfones (III, IV) and polyarylthioethers (V), which have an ion exchange equivalent of from 0.3 mmol of $H^+/g$ to 2 mmol of $H^+/g$. It is precisely these polymers which, owing to their chemical structure, are particularly stable under the conditions prevailing in a fuel cell.

The preparation of the polymers, the sulfonated polymers and the preparation of membranes from these polymers is disclosed, for example, by the literature mentioned below, which is incorporated herein by reference: EP-A-0 008 895;

EP-A-O 575 807; DE-A-4 242 692; K. Ledjeff et al., J. Membrane Sci. 83, 211–220 (1993); B. C. Johnson et al., J. Polym. Sci., Polym Chem. Ed., 22, 721–737; A. Noshay, L. M. Robeson, J. Appl. Polym. Sci. 20, 1885–1903 (1976). Equally, mixtures of these sulfonated polymers with one another and mixtures of the sulfonated polymers with other polymers can be used which preferably are likewise soluble in aprotic polar solvents.

The method according to the invention comprises the following process steps:

1. Coating of a foil made of a cation exchange material by casting, spraying or immersion using a suspension containing the following components: a liquid solvent or suspension medium; a dissolved polymer electrolyte and an electrically conductive catalyst material, for example a conductive carbon material impregnated with a catalytically active metal. Optionally, further polymers may be present in the suspension.
2. Drying of the membrane, if necessary.

In order for the catalytically active layer thus applied to be rendered porous and thus have its specific surface area enlarged, one or more of the following process steps can then be carried out according to the invention:

3. Swelling of the membrane in a liquid which is a solvent for the polymer electrolyte present in the catalytically active layer.
4. Bringing the membrane obtained in step 3 into contact with a liquid which is miscible with the solvent, but is a non-solvent for the polymer electrolyte mentioned in step 3.
5. Drying of the membrane.

Preferably, prior to coating the foil is roughened mechanically or by solvation and reprecipitation.

Alternatively it is possible, to generate a porous top layer, to carry out a simplified procedure, in which the steps 2 and 3 of the above-described process are omitted. If the porous top layer generated by step 4 collapses during drying, the use of the non-solvent mentioned under 4 is replaced by the use of a series of non-solvents of decreasing polarity, e.g. first an alcohol (e.g. methanol, ethanol, n/i-propanol, n/i/t-butanol), followed by a ketone (e.g. acetone, methyl ethyl ketone, cyclohexanone), followed by an aliphatic or cycloaliphatic ether (e.g. diethyl ether, t-butyl methyl ether, tetrahydrofuran) and finally a volatile hydrocarbon.

The above-described method is further defined by the option of using not only the above-described polymer electrolytes, but also their mixtures with other polymers in the suspensions employed for coating. In particular, the following polymers are used:

polymers which are stable under the operating conditions of an electrochemical cell, are soluble in the same solvent as the above-described polymer electrolyte, and are suitable for improving the mechanical properties of the top layer, in particular soluble polymers such as ®Ultrason S (aromatic polyethersulfone containing bisphenol A units, BASF AG), ®Ultrason E (aromatic polyethersulfone, BASF AG), ®Radel (aromatic polyethersulfone containing biphenylene units, Amoco Performance Products) or ®Ultem (aromatic polyether imide, General Electric Co.).

Polymers which owing to their hydrophobicity are suitable for hydrophobicizing the membrane surface, in particular fluoropolymers and PTFE. In particular, it is advisable for only that side of the membrane which, in a fuel cell, faces the cathode side (also referred to as "oxygen side") to be provided with a hydrophobicized top layer, while the other side has a non-hydrophobicized top layer applied to it.

In mixtures with proton-nonconductive polymers, the proton-nonconductive polymer is used, in particular, in concentrations of less than 60 wt %. In a further embodiment of the method according to the invention, the top layer is applied to a membrane. Optionally, the top layer may also be applied to a membrane containing a sulfonated fluoropolymer or comprises mixtures thereof with other polymers. Sulfonated fluoropolymers which can be used according to the invention for example contain repeat units having the structures VI and VII. Such polymers are available, in the form of membranes, in particular from E. I. du Pont de Nemours & Co. under the tradename ®Nafion and from Dow Chemical Co.

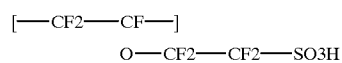

VI

VII

Instead of the abovementioned polymer electrolytes it is also possible to employ their derivatives, in which some of the sulfonic acid groups have been derivatized. The service properties and processing properties, for example the mechanical properties and the permeability of the membrane, can be systematically varied by derivatization of the sulfonic acid group.

Particular derivatives used of the abovementioned polymer electrolytes are salts of the sulfonic acids, sulfonyl chlorides and sulfonic acid amides. Salts of the sulfonic acid can be prepared using metal salts, ammonium salts, amines and their quatemary salts, and phosphonium salts. Sulfonyl chlorides are prepared from the sulfonic acids, using suitable sulfonation reagents or by chlorosulfonation of nonsulfonated polymers. Sulfonamides are produced by the reaction of the sulfonyl chlorides with primary and secondary amines. The reaction with diamines and higher amines provides an option, via sulfonamide formation, of crosslinking the polymers. This option is also provided by the polymers being exposed to high-energy irradiation.

Particular solvents used for the polymer in steps 1 to 3 are N-methylpyrrolidone (NMP), dimethyl sulfoxide (DMSO), (-butyrolactone ((-BLO) and dimethylacetamide (DMAC). For step 1 and 3, in particular, polymer solutions having concentrations of from 15 to 40%, in particular from 20% to 35% of the polymer in the solvent are used.

Swelling or spraying of the membrane in 1 and 3 is carried out, in particular, with the aid of mixtures of water and NMP, DMSO, (-BLO or DMAC, water being present in a concentration of from 5% to 50%, in particular from 10 to 45%. The liquid mentioned in step 4 should be miscible with the solvent and swelling medium used in step 1 and 3. Particularly suitable for step 4 is water containing, in concentrations of from 2% to 30%, a polar-aprotic solvent for the polymer (e.g. NMP, DMSO, (-BLO, DMAC). Also suitable are lower aliphatic alcohols (e.g. methanol, ethanol, n/i-propanol, n/i/t-butanol) and ketones (e.g. acetone, methyl ethyl ketone, butanone).

The membrane drying process (step 2 and step 5) is preferably carried out at temperatures of between 20 EC and 140 EC, in particular at temperatures of between 30 and 100 EC, preferably between 40 and 80 EC. To accelerate the drying process it is also possible to work at reduced pressure. The membranes thus obtained in particular have a thickness in the range of from 10 µm to 250 µm, preferably from 20 µm to 200 µm.

A particular advantage to be emphasized of the method described herein is that it can be carried out in a simple manner. In contrast to the hitherto customary ink methods (U.S. Pat. No. 5,211,984), high temperatures and pressures are not required.

The electrically conductive carbon material used is preferably a fine-grained powder of conductive activated carbon, carbon black, graphite or graphitized activated carbon, the powder being impregnated with a catalytically active metal. Potentially suitable catalytically active metals are, in particular, elements of the groups VIIIa (Fe, Co, Ni, Ru, Rh, Pd, Os, Ir, Pt) and Ib (Cu, Ag, Au) of the Periodic Table of the Elements or tin or titanium or mixtures or alloys of said elements. In particular, the following alloys and mixtures are used:

platinum/ruthenium platinum/ruthenium/tin iridium oxide/titanium

The last mentioned mixture can also be used in pure form without carbon. The coverage of the membrane with the metal is preferably in the range of from 0.001 mg/cm$^2$ to 10 mg/cm$^2$.

The porous surface layer of the foil has a thickness of between 1 µm and 100 µm, in particular 30 and 50 µm, and has pores having a diameter of from 0.01 µm to 10 µm.

In a further preferred embodiment of the invention, the surface is corrugated having a wavelength of from 0.1 µm to 1 µm and a wave depth of from 0.1 µm to 0.2 µm.

The total thickness of the membrane is from 50 to 1000 µm, in particular from 100 to 700 µm.

The membrane metallized according to the invention constitutes a membrane-electrode unit which allows the fuel gases, for example $H_2$ and $O_2$, of a membrane fuel cell access to a large specific membrane surface area. This results in a high activity of the membrane-electrode unit, since the surface of the membrane is porous and the catalytically active metal is disposed not only directly on the membrane surface, but also in the pores of the surface.

The cation exchange membranes prepared in accordance with the above-described methods are particularly suitable for use in electrochemical cells, for example in electrolytic cells and in membrane fuel cells.

EXAMPLES

Example 1

20 g of the sulfonation product of polymer II, which was prepared in accordance with EP-A-0 575 801 (ion exchange equivalent 1.4 mmol of H$^+$/g), are dissolved in 100 ml of NMP. The solution is knife-coated onto a glass plate to produce a film of homogeneous thickness and is dried in a circulating oven at 80 EC. The film thus obtained is 100 µm thick. Onto this film a liquid having the following composition is applied on both sides: 200 mg of polymer II dissolved in 800 mg of N-methylpyrrolidone, 300 mg of XC-72 carbon powder from Prototech (carbon powder is impregnated with 19.8 wt % of platinum). The film with the top layer thus obtained is dried for 12 h at 80 EC, water-treated for 24 h and dried again. The membrane thus prepared is employed in fuel cells as a proton conductor membrane having a catalytically active top layer.

Example 2

20 g of the sulfonation product of polymer II, which was prepared in accordance with EP-A-0 575 801 (ion exchange equivalent 1.4 mmol of H$^+$/g), are dissolved in 100 ml of NMP. The solution is knife-coated onto a glass plate to produce a film of homogeneous thickness and is dried in a circulating oven at 80 EC. The film thus obtained is 100 µm thick. Onto this film a liquid having the following composition is applied on both sides: 200 mg of polymer II dissolved in 800 mg of N-methylpyrrolidone, 300 mg of XC-72 carbon powder from Prototech (carbon powder is impregnated with 19.8 wt % of platinum). The film with the top layer thus obtained is immersed for 5 min in a mixture of 70% water and 30% NMP and in the process develops a porous surface. The membrane thus prepared is employed in fuel cells as a proton conductor membrane having a catalytically active top layer.

What is claimed is:

1. A method for preparing a cation exchange membrane, comprising the introduction of an organic polymer having sulfonic acid groups and wherein the polymer is a sulfonated aromatic polyetherketone, polysulfone, poly (arylene sulfide) or polybenzimidazole and of finely dispersed electrically conductive particles of a catalyst material into a liquid phase, the resulting suspension being used to coat a foil of a cation exchange material on at least one side, wherein the organic polymer having sulfonic acid groups is soluble in an aprotic polar solvent and contains units of the formulae (Ar$^1$X) and (Ar$^2$Y) which are at least partially substituted by sulfonic acid groups, Ar$^1$ and Ar$^2$ being identical or different bivalent arylene radicals, X being oxygen or sulfur and Y being a carbonyl radical, sulfoxide radical or sulfonyl radical and the polymer being dissolved in a solvent, a finely dispersed electrically conductive catalyst material being suspended in the solution and this suspension being used to coat a foil which contains a polymeric cation exchanger having sulfonic acid groups and the coating which still contains solvent being treated with a liquid which is miscible with the solvent, but in which the dissolved cation exchange material is insoluble, so that pores are formed in the top layer of the membrane and the ion exchange capacity of the membrane is from 0.3 to 3 mnol of H$^+$/g.

2. The method as claimed in claim 1, wherein the polymer also contains bivalent radicals of the formula, Ar$^3$—C(CF$_3$)$_2$—, Ar$^3$—C—(phenyl)$_2$—, the radical Ar$^3$-cyclohexylene, Ar$^3$ being an aromatic unit.

3. The method as claimed in claim 1, wherein the electrically conductive catalyst material contains one or more elements of the groups VIIIa (Fe, Co, Ni, Ru, Pd, Os, Ir, Pt) or Ib (Cu, Ag, Au) of the Periodic Table of the Elements or tin or titanium or mixtures or alloys of these elements.

4. The method as claimed in claim 1, wherein the electrically conductive catalyst material is a carbon material which is impregnated with a metal of the groups VIIIa or Ib of the Periodic Table of the Elements or tin or titanium or mixtures or alloys of these elements.

5. The method as claimed in claim 1, wherein the coverage of the membrane with the catalytically active catalyst material is from 0.001 mg/cm$^2$ to 10 mg/cm$^2$.

6. The method as claimed in claim 1, wherein the membrane after coating is freed from any solvent still adhering by drying.

7. The method as claimed in claim 1, wherein the foil, prior to coating, is roughened mechanically or by salvation and repreciptation.

8. The method as claimed in claim 1, wherein the surface of the membrane is crosslinked by exposure to high-energy irradiation or suitable chemical substances.

\* \* \* \* \*